United States Patent [19]

Pedrotto

[11] Patent Number: 5,653,328
[45] Date of Patent: Aug. 5, 1997

[54] EQUIPMENT FOR FORMING ORDERED GROUPS OF ARTICLES FROM A GENERALLY FLAT FLOW OF ARTICLES, PARTICULARLY FOR AUTOMATIC PACKAGING SYSTEMS

[75] Inventor: Gianfranco Pedrotto, Neviglie, Italy

[73] Assignee: Soremartec S.A., Schoppach-Arlon, Belgium

[21] Appl. No.: 465,174

[22] Filed: Jun. 5, 1995

[30] Foreign Application Priority Data

Nov. 18, 1994 [CH] Switzerland ............... 3488/94

[51] Int. Cl.$^6$ .................................................. B65G 47/30
[52] U.S. Cl. ................................. 198/418.1; 198/418.6; 198/433
[58] Field of Search ........................... 198/418.1, 418.6, 198/433, 419.1, 468.6, 446

[56] References Cited

U.S. PATENT DOCUMENTS

| | | | |
|---|---|---|---|
| 3,370,691 | 2/1968 | Mosterd | 198/433 |
| 3,884,343 | 5/1975 | Stephens et al. | |
| 4,042,100 | 8/1977 | Morrone | 198/446 |
| 4,173,276 | 11/1979 | Raudat et al. | 198/446 X |
| 4,863,008 | 9/1989 | Doi | 198/418.6 X |
| 5,333,721 | 8/1994 | Stevie | 198/418.6 |
| 5,548,941 | 8/1996 | Portaro et al. | 198/418.1 X |

FOREIGN PATENT DOCUMENTS

| | | |
|---|---|---|
| 665062 | 10/1965 | Belgium . |
| 0083324 | 7/1983 | European Pat. Off. . |
| 882670 | 7/1953 | Germany . |
| 1216784 | 5/1966 | Germany . |
| 409762 | 10/1966 | Switzerland . |
| 2130542 | 6/1984 | United Kingdom . |

*Primary Examiner*—D. Glenn Dayoan
*Attorney, Agent, or Firm*—Rothwell, Figg, Ernst & Kurz

[57] ABSTRACT

The articles which move towards the equipment in a disorganised two-dimensional flow are conveyed to a channelling unit including a plurality of vertical blades, the upstream ends of which are preferably given a vibratory movement so as to assist the formation of lines of articles side by side in the channels between adjacent blades. The downstream end of the channelling unit is formed as a chute and a rotary distributor is arranged at its output end. The articles coming from the output end of the channelling unit form ordered groups along the faces of the distributor. The stepwise rotation of the distributor causes the ordered groups of articles to drop into an underlying channel. This channel has movable walls which enable it to deposit the groups of articles on an underlying conveyor and which also follows the movement of the conveyor during the deposition of the groups of articles.

11 Claims, 1 Drawing Sheet

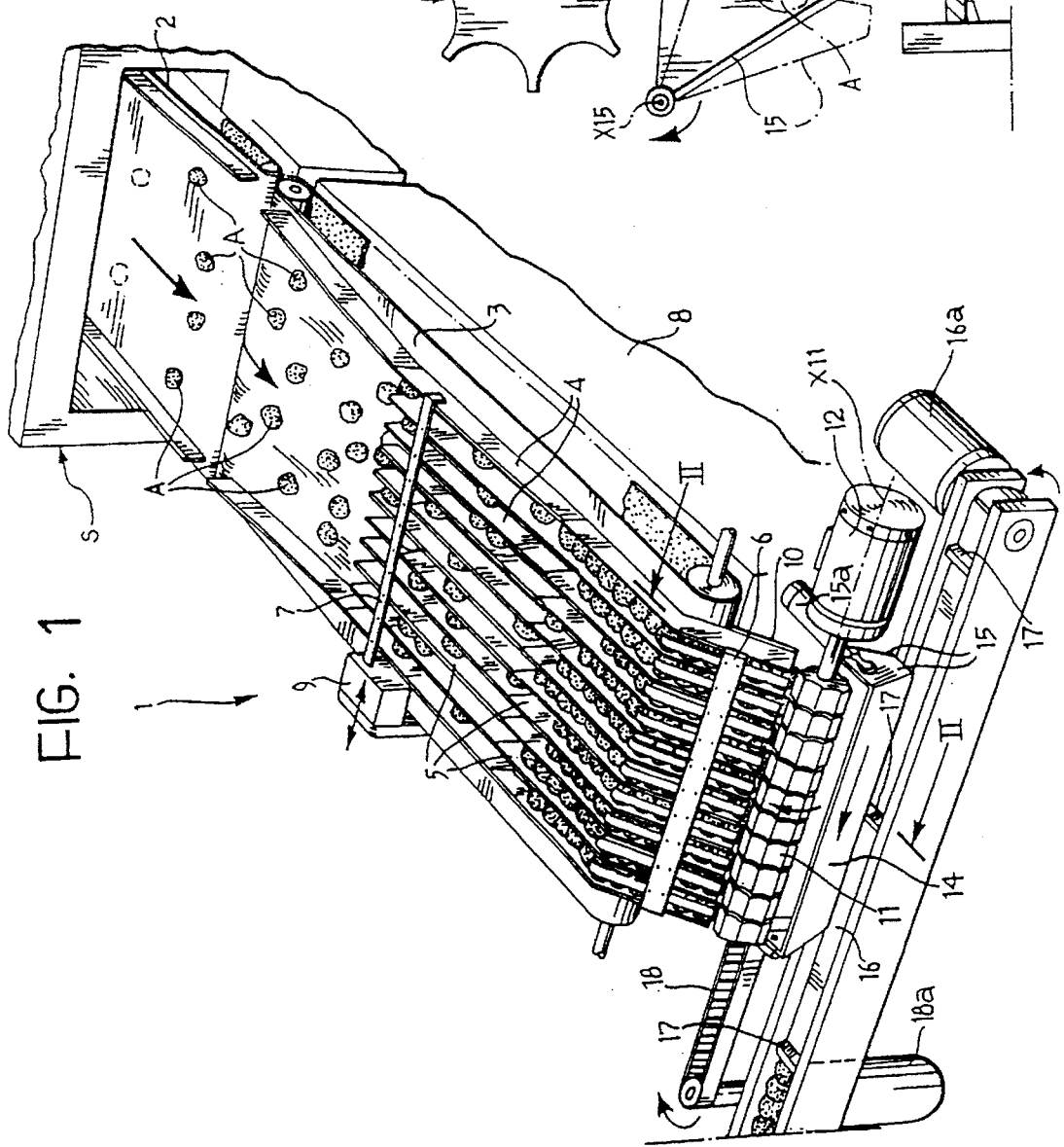

“5,653,328”

EQUIPMENT FOR FORMING ORDERED GROUPS OF ARTICLES FROM A GENERALLY FLAT FLOW OF ARTICLES, PARTICULARLY FOR AUTOMATIC PACKAGING SYSTEMS

BACKGROUND OF THE INVENTION

The present invention relates to equipment for forming ordered groups of articles.

The invention has been developed with particular attention to its possible application in the field of automatic packaging systems for products such as food products.

In this context, the problem often arises of how to ensure that products (such as, for example spherical chocolates of the type described in the patent EP-A-0 0 083 324) issuing from a production line in an almost continuous carpet which does, however, have some irregularities, may be gathered into ordered groups for packaging.

Arrangements put forward until today to solve this problem have usually required a sequence of somewhat complicated manipulations. The incoming flow of articles (which, as stated above, may be fairly irregular or disorganised) is subjected to a series of operations aimed at putting it in order, for example by forming rows or lines and then removing articles in an ordered manner until, after further manipulations, they form groups each including a predetermined number of articles.

In practice, however, such arrangements involve attempts to reconcile different, often opposing requirements.

Firstly, manipulations (which should be as few as possible) are carried out on articles which are moving through the packaging plant at a speed reflecting the output of the production plant itself. This rate tends to increase as plants become more sophisticated.

In addition, the products being handled (we refer in particular to food products, especially confectionery) may often be fairly fragile and liable to be damaged as a result of excessive shocks suffered during handling operations.

The need to follow particular aesthetic guidelines when packing the articles also means that they may need to be arranged in groupings which are difficult to achieve, with regard both to the number of articles in each group and to their positioning relative to each other. This is the case, for example, of packaging in which a relatively large number of spherical pralines (typically seven or eight) are aligned in a group intended to be inserted in a tubular package of the type known as a flow-pack.

A final consideration is that it is desirable for the equipment which is to form the groups of articles to be readily adaptable to vary the characteristics of the groups of articles (so-called format-change operations) for example, to switch from the formation of lines of eight articles to the formation of lines of six or ten articles.

SUMMARY OF THE INVENTION

The object of the present invention is to provide equipment of simple construction which is able to satisfy the requirements laid out above.

This object is achieved according to the present invention by equipment for forming groups of articles.

DESCRIPTION OF THE DRAWINGS

The invention will now be described, purely by way of non-limitative example, with reference to the appended drawings, in which:

FIG. 1 is an overall perspective view of equipment according to the invention; and FIG. 2 is a sectioned view taken on the line II—II of FIG. 1.

DETAILED DESCRIPTION OF THE DRAWINGS

In the drawings, equipment for forming groups of articles is generally indicated 1 and is intended to be used, for preference, in an automatic packaging plant.

This could be a plant for the automatic packaging of articles such as confectionery products. By way of example, the following description will refer to the use of equipment according to the invention for handling food products constituted by spherical pralines such as those described in the document EP-A-0 083 324 mentioned earlier.

This possible application should naturally be viewed purely as an example since the invention is of general application.

In order to provide a clear picture of the invention, it is supposed that the equipment 1 is arranged at the outlet of a production unit S (such as, for example, a refrigeration tunnel not illustrated in detail) from which the articles A emerge on a conveyor 2 (of generally known type, for example, a motor-driven belt or mat of a type currently used in the handling of food products) in the form of a more or less dense, flat flow of articles A.

This flow of articles is generally not organised, in the sense that it may have gaps of various dimensions, depending on occurrences such as temporary interruptions in the output from the unit S, the possible discarding of faulty products and the like.

Starting from conveyor 2, the articles A advance on the conveyor 2 (which comes to form an integral part of the equipment 1) or on another motor-driven conveyor 3, arranged in cascade with the conveyor 2 and synchronised (in known manner) therewith, towards a channelling unit 4, constituted essentially by a plurality of blades 5 (for example 10) extending in the general direction of the flow of articles A. The blades 5 are arranged side by side, perpendicular to the conveying surface of the conveyor 3 and just above it.

The blades 5 may be constituted, for example, by steel blades, supported in their assembled positions (usually with constant spacings between the blades 5 in the channelling unit 4) by cross-members 6 and 7 mounted on the framework 8 of the equipment 1 (this framework is not illustrated in detail in the drawings for the sake of simplicity).

In the embodiment illustrated, two cross-members 6, 7 have been used, of which the second (the order being understood as being in the direction of advance of the articles A through the equipment 1) is fixed to the framework 8. The first cross-member 7, on the other hand, which is arranged upstream of the other in the direction of advance of the articles A, is supported on the framework 8 by means of an oscillation-control device 9 (such as, for example an actuator or, preferably, a device with a motor-driven eccentric) which reciprocates the cross-member 7 transverse to the direction of advance of the articles A. This reciprocating movement is transmitted to the upstream ends of the blades 5 which are supported by the cross-member 7.

The arrangement of the blades 5, helped by the reciprocation of their upstream ends imparted by the device 9, causes the articles A, making up the flow advancing on the conveyor 3 coming from the unit S, to enter the channels between the blades 5 and to begin arranging themselves into adjacent lines of articles, each line being between two adjacent blades 5.

As stated earlier, there may be any number of blades 5.

It is possible to vary selectively the number of channels between the blades 5 so as to vary selectively the number of adjacent lines of articles A formed from the flow from the unit S.

The action of selectively adjusting the number of channels between the blades 5 may be carried out either by altering the number of blades or by obstructing (with obstruction elements which are not specifically illustrated) the upstream ends of one or more of the channels of the unit 4 so as to prevent the articles A from forming a line in this channel.

As a result of the general forward movement imparted by the conveyor 3, the lines of articles A formed in the channelling unit 4 gradually advance towards the downstream end of the channelling unit 4 which is preferably formed as a chute, that is as an inclined plane 10 (which may simply be a sheet of metal) down which the articles A between the blades 5 slide or fall under gravity towards a rotary distributor generally indicated 11.

The distributor 11 is constituted essentially by a rotary element which is rotated about a horizontal or substantially horizontal axis XII by a drive assembly 12.

In the embodiment illustrated by way of example in the appended drawings, the distributor 11 is essentially like a fluted column, that is, an approximately prismatic body (with an octagonal section for example) with generally concave faces 13. The radius of curvature (actual or overall according to whether the curved shape is in the form of part of a cylindrical surface or part of a curved but not cylindrical surface)) of the faces 13 is selected so as to correspond overall to the equivalent dimensions of the articles A to be handled.

As may easily be observed from FIG. 2, the arrangement means that, when they move down the chute 10, the articles A engage a face 13 of the distributor.

A line of articles A, constituting an ordered group of the articles A, thus forms along each face 13 of the distributor 11 in turn as it faces the outlet end of the chute 10. Naturally, the number of articles A in each group corresponds to the number of channels of the unit 4 operating at the time to channel the articles flowing from the unit S.

The drive assembly 12 rotates the distributor 11 through angular steps determined by the angular extent of the faces 13. If, for example, the distributor 11 has eight faces 13, the assembly 12 rotates the distributor 11 through angular steps of 45°. The distributor 11 is rotated in the sense which causes a line of articles A which is forming along the face 13 facing the chute 10 to drop into an underlying channel 14 while a new face 13 of the distributor 11 comes to face the outlet end of the chute 10 so as to allow it to receive a new line or group of articles A.

The dimensions of the distributor 11 and of its faces 13 are chosen in dependence on the position of the axis XII and the position of the outlet end of the chute 10 so that the articles A descending the chute 10 stop against the face 13 of the distributor 11 facing the outlet end of the chute 10 at any one moment. These dimensions are also selected such that the rotational movement (clockwise with reference to the observation point of FIG. 2) which causes the line of articles A formed against the distributor 11 to drop into the underlying channel 14 (the longitudinal centre plane of which is usually aligned with the axis of rotation XII of the distributor 11) occurs without the articles A themselves being squashed.

As is more visible in the sectioned view of FIG. 2, the channel 14 is usually defined by two plates 15 which, in the condition for receiving the articles A (position shown by the unbroken line in FIG. 2), are inclined to each other, with their lower ends closer together than their upper ends. They thereby define a reception channel for the articles A which is open at the bottom but with this bottom aperture dimensioned so that the articles A cannot fall out.

A drive assembly 15a is connected to at least one of the plates 15 for reciprocating either one or both of the plates 15 about a respective horizontal pivot axis X15 along the upper edge of the plate 15. This pivoting (when both plates are pivoted rather than one alone, this movement is controlled in a coordinated manner so that the two plates 15 move in mirror symmetry, as illustrated schematically by the broken line of FIG. 2) causes the bottom opening of the channel 14 to widen and enables the line of articles A last received in the channel 14 itself to drop, in an orderly manner, onto an underlying conveyor 16 driven by a motor 16a and advancing parallel to the axis XII. This conveyor is preferably a so-called chain conveyor with entrainment projections 17 such that, as a result of the movement of the conveyor (from right to left with reference to the observation point of FIG. 1) each projection 17 bears against the last article A in a respective group, making the entire group advance towards a further station. This might be a packaging machine of the type known as a flow-pack or form-fill-seal (FFS for short) packaging machine, in which each group of articles A is inserted in a tubular wrapper with a longitudinal seal line and two end seal lines. Packaging machines of this type are widely known in the art, especially in the field of food packaging.

In order to make it easier to fit the groups of articles in the channel 14 into the drive-regions of the conveyor 16 between consecutive projections 17, it is preferable for the channel 14 not to be mounted in a fixed position but for the two blades 15 and their respective drive assemblies to be movable in a reciprocating manner along the direction of advance of the conveyor 16 under the action of a drive assembly constituted, for example, by a cogged belt 18 driven by a motor 18a.

The motor 12 which drives the stepwise rotation of the distributor 11 about the axis XII, the drive assembly or assemblies 15a associated with the blades 15 and the motor 18a which reciprocates the channel 14 along the direction of the conveyor 16 are actuated in synchronism with the advance of the conveyor 16 by a general control unit of the equipment 1. This unit can be a so-called programmable logic control unit or PLC. The general operating criteria and use of such units are widely known in the art, especially in the field of automatic packaging machines and their plants and do not need to be explained in detail herein, especially since they are not relevant to the purposes of the invention.

In particular, the sequence of operation of the drive assemblies listed above provides for the following operations to be carried out in a cycle:

rotation of the distributor 11 about the axis XII through ore step so as to make the group of articles A formed along the face 13 facing the outlet of the chute 10 drop into the channel 14 held under the distributor 11 with its plates 15 in their closed position;

start of the movement of the channel 14 following that of the conveyor 16 by activation of the motor 18a; this is effected so that the channel 14 remains in a precise position relative to the projections 17 of the underlying conveyor 16 so as to prevent the articles A from fitting one or more projections 17 or from losing their group formation when dropping onto the conveyor 16, activation of the drive assembly or assemblies 15a during this following movement, thereby causing the articles A collected in the channel 14 to drop onto a corresponding portion of the conveyor 16; and return of the channel 14 to its closed starting condition and to its starting position under the distributor 11.

Naturally, the principle of the invention remaining the unchanged, manufacturing details and embodiments may be varied widely from those described and illustrated without departing thereby from the scope of the present invention. This applies in particular to the conformation of the outlet end of the channelling unit 4 as a chute. This conformation is preferred but not imperative as far as ensuring that the articles A are fed regularly to the faces of the distributor 11.

What is claimed is:

1. Equipment for forming a generally flat flow of articles into ordered groups of these articles, with each group including a predetermined number of the articles, the equipment including:

a channelling unit comprising a plurality of channelling formations arranged side by side so as to be impinged upon by the flow of articles and defining respective channels between them for forming the articles into lines alongside each other; said channelling unit having an upstream end and a downstream end in the direction of advance of the articles, the downstream end including an outlet end which is formed as a chute, a rotary distributor adjacent the downstream end of the channelling unit and comprising a prismatic body rotatable about an axis of rotation which corresponds to a main axis of the body, the periphery of the distributor including a plurality of concave faces each defining a cavity for receiving a respective group of the articles located at the outlet end of the channelling unit; the distributor device having an associated drive which can drive its stepwise rotation so as to bring one of the faces, which has received a respective group of articles, into a position in which these articles are discharged while another face of the distributor is moved to face the outlet end of the channelling unit to receive a further group of the articles, and an output conveyor for receiving groups of the articles discharged from the distributor as a result of the aforesaid rotation.

2. Equipment according to claim 1, including a conveyor arranged at the upstream end of the channelling unit for advancing the articles between the channelling formations.

3. Equipment according to claim 1 wherein said channelling formations include a plurality of blades.

4. Equipment according to claim 1, including an actuator for transmitting a general vibratory movement to the upstream end of the channelling formations so as to facilitate the entry of the articles into the channels.

5. Equipment according to claim 1, wherein the associated drive rotates the distributor through angular steps corresponding to the angular extent of the faces of the distributor.

6. Equipment according to claim 1, wherein the output conveyor includes a channel arranged under the distributor so as to receive the groups of articles from the faces of the distributor as each face is brought into the discharge position.

7. Equipment according to claim 6, wherein the channel has at least one wall which is movable between a receiving position, in which the articles discharged in groups from the distributor are received in the channel and an output position in which, as a result of an opening movement of the at least one movable wall, the groups of articles drop from the channel.

8. Equipment according to claim 7, wherein the channel is defined essentially by two pivotable walls in the form of plates which are movable in mirror symmetry between the receiving position and the output position.

9. Equipment according to claim 1, wherein the output conveyor includes:

a main conveyor for receiving the articles in the groups which can move beneath the distributor in a direction substantially parallel to the longitudinal extent of the distributor itself, and a reception unit for receiving the articles interposed between the distributor and the main output conveyor with associated drive means for reciprocating the reception unit longitudinally, with an active travel following the movement of the main output conveyor from a position generally beneath the distributor.

10. Equipment according to claim 6 wherein the output conveyor includes:

a main conveyor for receiving the articles in the groups which can move beneath the distributor in a direction substantially parallel to the longitudinal extent of the distributor, and a reception unit for receiving the articles interposed between the distributor and the main output conveyor with associated drive means for reciprocating the reception unit longitudinally, with an active travel following the movement of the main output conveyor from a position generally beneath the distributor wherein the reception unit is constituted by said channel.

11. Equipment according to claim 9 wherein the output conveyor comprises a motor-driven conveyor with positive-drive elements for advancing the groups of articles and said active travel is synchronised with the movement of the drive formations so as to prevent them from interfering with the articles coming from said reception unit.

* * * * *

UNITED STATES PATENT AND TRADEMARK OFFICE
CERTIFICATE OF CORRECTION

PATENT NO. : 5,653,328
DATED : August 5, 1997
INVENTOR(S) : Gianfranco Pedrotto

It is certified that error appears in the above-indentified patent and that said Letters Patent is hereby corrected as shown below:

In the Specification: Col. 3, line 33, "surface))" should be -- surface) --; Col. 4, line 59, "ore" should be -- one --; Col. 5, line 9, delete "the" (third occurrence).

Signed and Sealed this

Eleventh Day of November, 1997

Attest:

BRUCE LEHMAN

Attesting Officer

Commissioner of Patents and Trademarks